United States Patent
Ahmed

(10) Patent No.: US 11,489,849 B2
(45) Date of Patent: Nov. 1, 2022

(54) METHOD AND SYSTEM FOR DETECTING AND REMEDIATING MALICIOUS CODE IN A COMPUTER NETWORK

(71) Applicant: Saudi Arabian Oil Company, Dhahran (SA)

(72) Inventor: Urfan Ahmed, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 381 days.

(21) Appl. No.: 16/742,406

(22) Filed: Jan. 14, 2020

(65) Prior Publication Data

US 2021/0218759 A1    Jul. 15, 2021

(51) Int. Cl.
H04L 29/06    (2006.01)
H04L 9/40    (2022.01)
G06F 11/07    (2006.01)

(52) U.S. Cl.
CPC ...... H04L 63/1416 (2013.01); G06F 11/0793 (2013.01); H04L 63/0281 (2013.01)

(58) Field of Classification Search
CPC ............ H04L 63/1416; H04L 63/0281; G06F 11/0793
See application file for complete search history.

(56) References Cited

U.S. PATENT DOCUMENTS

| | | | |
|---|---|---|---|
| 9,723,027 B2 | 1/2017 | Vazquez Carames | |
| 10,073,970 B2 | 9/2018 | Kraemer | |
| 10,135,847 B2 | 11/2018 | Althouse et al. | |
| 2009/0158430 A1* | 6/2009 | Borders | G06F 21/552 726/23 |
| 2015/0256639 A1* | 9/2015 | Chow | H04L 67/22 709/213 |
| 2016/0381051 A1 | 12/2016 | Edwards et al. | |
| 2017/0093918 A1* | 3/2017 | Banerjee | H04L 63/20 |
| 2017/0244729 A1* | 8/2017 | Fahrny | H04L 63/0823 |
| 2017/0339166 A1 | 11/2017 | Althouse et al. | |
| 2018/0077201 A1 | 3/2018 | Boutnaru | |

(Continued)

FOREIGN PATENT DOCUMENTS

WO    2017/175157 A1    10/2017

OTHER PUBLICATIONS

Google Scholar search Result attached (Year: 2022).*

(Continued)

Primary Examiner — Tri M Tran
(74) Attorney, Agent, or Firm — Leason Ellis LLP

(57) ABSTRACT

A cybersecurity solution that includes a system, method, or computer program for detecting and remediating malicious code in a communicating device on a computer network that connects to the Internet through a proxy server. The solution includes an operating system arranged to monitor all computing resource (CR) processes on an operating system kernel on the communicating device, determine process parameters for each CR process, determine whether each CR process is a connecting CR process by determining whether it is connecting to the proxy server, compare at least one of the process parameters for each connecting CR process with a whitelist, generate an event notification when at least one process parameter for a connecting CR process does not match the whitelist, and remediate the connecting CR process that has the at least one process parameter.

23 Claims, 5 Drawing Sheets

(56) References Cited

U.S. PATENT DOCUMENTS

| | | | |
|---|---|---|---|
| 2018/0144124 A1* | 5/2018 | Lahav | H04L 63/101 |
| 2020/0287802 A1* | 9/2020 | Singh | H04L 41/5016 |
| 2021/0160192 A1* | 5/2021 | Jain | G06F 9/545 |

OTHER PUBLICATIONS

International Search Report and Written Opinion in Corresponding PCT Application No. PCT/US2021/012622 dated Mar. 30, 2021. 11 pages.

* cited by examiner

METHOD AND SYSTEM FOR DETECTING AND REMEDIATING MALICIOUS CODE IN A COMPUTER NETWORK

FIELD OF THE DISCLOSURE

The present disclosure relates to a cybersecurity solution that includes a system, method or computer program for detecting and remediating malware or malicious code on a computer network and, more particularly, for detecting and remediating cybersecurity threats related to fileless malware or malicious code such as, for example, shellcode, reverse shells or malware on one or more computer resource assets in a computer network.

BACKGROUND OF THE DISCLOSURE

The Internet is a worldwide network of interconnected computer networks that use the Transmission Control Protocol/Internet Protocol (TCP/IP) to link communicating devices worldwide. The Internet includes private, public, academic, business, and government networks, all of which are interlinked by arrays of electronic, wireless, wired, or optical networking technologies. The Internet carries a broad range of information resources and services, including the World Wide Web (WWW), electronic mail, telephony, and file sharing. As the Internet evolves and network systems become increasingly under attack, cybersecurity solutions are taking on ever-greater importance. However, existing cybersecurity solutions have significant shortcomings, which are addressed by the cybersecurity solution provided in this disclosure.

SUMMARY OF THE DISCLOSURE

The disclosure provides a cybersecurity solution, including a method, a system, or a computer program for detecting and remediating cybersecurity threats related to fileless malware or malicious code such as, for example, shellcode, reverse shells or malware on one or more computer resource assets in a computer network. In a nonlimiting embodiment, the solution includes a method for detecting and remediating malicious code in a communicating device on a computer network that connects to the Internet through a proxy server. The method comprises monitoring all computing resource (CR) processes on an operating system kernel on the communicating device, determining process parameters for each computing resource (CR) process, including at least one of a canonical path, a process name, and a process identification number, determining, for each computing resource (CR) process, whether the computing resource (CR) process is a connecting CR process by determining whether the computer resource (CR) process is connecting to the proxy server, comparing at least one of the process parameters for each connecting CR process with a computing resource (CR) whitelist, generating an event notification when the at least one process parameter for a connecting CR process does not match any record in the computing resource (CR) whitelist, and remediating said connecting CR process having said at least one process parameter. The method can include creating a record containing the process parameters for the connecting CR process and storing the record in a storage on the communicating device.

In the method, the at least one of the process parameters can include the process name and canonical path, or the computing resource (CR) whitelist can include a list of processes authorized to run on the operating system kernel, or the remediating the connecting CR process can include terminating said connecting CR process. The remediating the connecting CR process can include sending the event notification to another communicating device on the computer network to execute a remedial action.

In the method, the stored record can include the canonical path, process name, and process identification number, or the stored record can include a time stamp when the connecting CR process was determined to be connecting to the proxy server, or the process identification number can be generated by the operating system kernel.

In another nonlimiting embodiment, the solution includes a system for detecting and remediating malicious code in a communicating device on a computer network that connects to the Internet through a proxy server. The system includes an operating system arranged to (i) monitor all computing resource (CR) processes on an operating system kernel on the communicating device, (ii) determine process parameters for each computing resource (CR) process, including at least one of a canonical path, a process name, and a process identification number, (iii) determine, for each computing resource (CR) process, whether the computing resource (CR) process is a connecting CR process by determining whether the computer resource (CR) process is connecting to the proxy server, (iv) compare at least one of the process parameters for each connecting CR process with a computing resource (CR) whitelist, (v) generate an event notification when the at least one process parameter for a connecting CR process does not match any record in the computing resource (CR) whitelist, and (vi) remediate said connecting CR process having said at least one process parameter.

In the system, the operating system can include a process monitor that is arranged to monitor all the computing resource (CR) processes on the operating system kernel on the communicating device, determine the process parameters for each computing resource (CR) process, including the canonical path, process name, and process identification number, and determine the connecting CR process by determining whether the computer resource (CR) process is connecting to the proxy server.

In the system, the operating system can include an event generator that is arranged to compare the at least one of the process parameters for each connecting CR process with the computing resource (CR) whitelist, and generate the event notification when the at least one process parameter for the connecting CR process does not match any record in the computing resource (CR) whitelist.

In the system, the operating system can include an event remediator that is arranged to remediate said connecting CR process having said at least one process parameter, or an event logger that is arranged to create a record containing the process parameters for the connecting CR process and store the record in a storage on the communicating device.

In the system, said at least one of the process parameters can include the process name and canonical path, or the computing resource (CR) whitelist can include a list of processes authorized to run on the operating system kernel.

In the system, the remediate said connecting CR process having said at least one process parameter can include terminating said connecting CR process or sending the event notification to another communicating device on the computer network to execute a remedial action.

In the system, the stored record can include the canonical path, process name, and process identification number, or the stored record can include a time stamp when the connecting CR process was determined to be connecting to the proxy server.

In the system, the process identification number can be generated by the operating system kernel.

In another nonlimiting embodiment, the solution includes a non-transitory computer readable storage medium storing computer program instructions that, when executed by a computing device on a communication device on a computer network that connects to the Internet through a proxy server, detects and remediates malicious code on the communicating device. The computer program instructions include (i) monitoring all computing resource (CR) processes on an operating system kernel on the communicating device, (ii) determining process parameters for each computing resource (CR) process, including at least one of a canonical path, a process name, and a process identification number, (iii) determining, for each computing resource (CR) process, whether the computing resource (CR) process is a connecting CR process by determining whether the computer resource (CR) process is connecting to the proxy server, (iv) comparing at least one of the process parameters for each connecting CR process with a computing resource (CR) whitelist, (v) generating an event notification when the at least one process parameter for a connecting CR process does not match any record in the computing resource (CR) whitelist, and (vi) remediating said connecting CR process having said at least one process parameter. The computer program instructions can include creating a record containing the process parameters for the connecting CR process and storing the record in a storage on the communicating device.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

Figure 1:
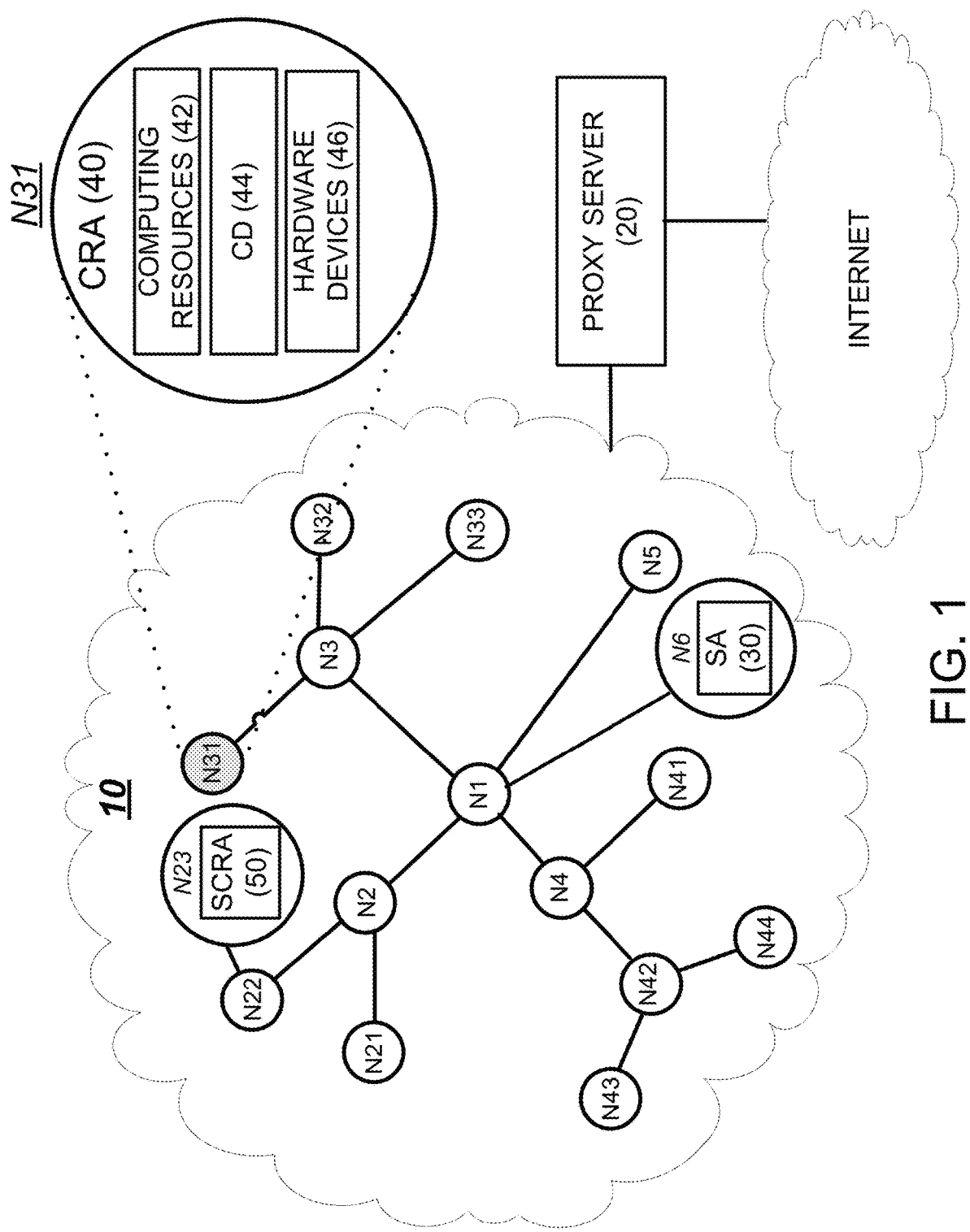
FIG. 1 shows an example of a computer network provided with a cybersecurity solution according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques can be omitted so as not to unnecessarily obscure the embodiments of the disclosure. The examples used are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Computer networks are continuously exposed to cyber-attack threats, many of which can be catastrophic to a computer network, its users or the entity that owns, controls, manages or has valuable computer (or computing) resource assets on the network, if successfully exploited. Networks can be especially vulnerable to cyberattacks that use difficult to detect fileless malware or malicious code, such as, for example, shellcode, reverse shells or malware on one or more computer resource assets in the network.

Fileless malware is a variant of computer-related malicious software that can exist exclusively as a computer-based artifact in a random-access-memory (RAM) on a computer resource asset such as a communicating device. It need not write any part of its activity to the computer resource asset, such as, for example, to a hard drive, thereby making it resistant to existing anticomputer forensic strategies that incorporate file-based whitelisting, signature detection, hardware verification, pattern-analysis or timestamping, leaving little evidence that could be used by digital forensic investigators to identify illegitimate or malicious activity.

Similarly, reverse shells can execute using operating system kernels on a computer resource asset without being detectable through digital forensic investigation. A shell can include a user interface that can be used to access to an operating system's services. A reverse shell can include a type of shell in which the target computer resource asset communicates back to an attacking computer resource asset. In general, operating system shells use either a command-line interface (CLI) or a graphical user interface (GUI), depending on the computer resource asset's role and operation. It is frequently referred to as a "shell" because it can be the outermost layer around the operating system kernel in a computer resource asset. In reverse shells, the attacking computer resource asset may have a listener port on which it can receive a connection and, by using code or command, the attacking computer resource asset can achieve execution on the target computer resource asset.

Shell shoveling typically refers to an act of redirecting an input or output of a shell on a target computer resource asset to a reverse shell so that the shell can be remotely accessed by the attacking computer resource asset.

Malicious code such as fileless malware or reverse shells can be hidden within processes and can be very difficult to detect. An operating system on a computer resource asset typically only sees a process and cannot determine whether the process is authorized. When the attacking computer resource asset takes control of the target computer resource asset on an organization's computer network, the attacking computer resource asset can connect to the Internet via a reverse shell or fileless malware and expose the target computer resource asset, as well as the computer network on which it is connected, to severe cyberattack threats. The problem can be compounded by many times for large or distributed computer networks that have computer resource assets located in different geographic locations or regions. There exists an urgent unfulfilled need for a cybersecurity solution that can detect and remediate cybersecurity threats related to fileless malware or malicious code such as, for example, shellcode or reverse shells on computer resource assets in a network.

This disclosure provides a cybersecurity solution that addresses the urgent and unfulfilled need. In a nonlimiting embodiment, the solution can monitor for connections or attempts to connect to a proxy server by one or more computing resource (CR) processes on an operating system kernel, in order to connect to the Internet. The solution can be arranged to employ a computer resource asset's own operating system to monitor for CR processes executed by the operating system kernel, compare the CR processes to a whitelist of authorized CR processes, and, if a CR process is determined to be an unauthorized CR process, generate an event notification and record the event in an event log. The solution can remediate a cybersecurity threat presented by the unauthorized CR process. The solution can generate an alert for the unauthorized CR process.

The cybersecurity solution can detect fileless malware or malicious code on a computer resource asset in a computer network and remediate cyberthreats presented by the malware or malicious code that might cause the computer resource asset to connect or attempt to connect through the proxy server to an attacking computer resource asset on the Internet. The cybersecurity solution can monitor to all CR processes on an operating system kernel and determine process parameters for each CR process, including at least one of a file path, a process name, and a process identification number, which can be generated by the operating system kernel. The solution can determine for each CR process whether it is a connecting CR process by detecting if the CR process is connecting or attempting to connect to the proxy server. The solution can compare the process parameters for each connecting CR process with a plurality of whitelisted process parameters stored in a computing resource (CR) whitelist database. The solution can monitor for a CR connecting process on the OS kernel even if it does not write to the computer resource asset's hard drive. The solution can maintain an event database, generate event records and log events in the event database when the process parameters do not match the whitelisted process parameters. The solution can remediate a cyberthreat presented by the connecting CR process that corresponds to the process parameters. The remediation can include terminating or suspending the connecting CR process, or terminating or suspending connectivity from or to the CR process. The solution can generate and transmit an alert notification to a security computing resource asset, which can be operated by, for example, a member of an enterprise's security team.

In a nonlimiting embodiment, the cybersecurity solution can include: running an internal clock or timer in a computer resource asset; executing the solution every 60 seconds, or any other predetermined periodic time interval; enumerating every CR process running in the OS kernel, including its file path, name, and ID number generated by the OS kernel; determining whether the CR process is connected to a proxy server; comparing the CR process to a whitelist of authorized processes; determining if the CR process is an authorized process; recording the process name, file path, ID number, and timestamp to the event log if the CR process is determined to be an unauthorized process; and creating and sending an event alert to a security computing resource asset if the CR process is not authorized.

FIG. 1 shows an example of a computer network 10 provided with a cybersecurity solution according to the principles of the disclosure. The computer network 10 can include, for example, a private network, a private enterprise network, a business network, a corporate network, an academia network, a military network, a government network or any other type of computer network. The computer network 10 can include a plurality of nodes N, including, for example, N1, N2, N21, N22, N23, N3, N31, N32, N33, N4, N41, N42, N43, N44, N5 and N6. The computer network 10 can include thousands, hundreds of thousands, millions or more nodes N. The computer network 10 can include one or more computer resource assets that are arranged to connect to each other, or to an external network (not shown) or the Internet. The computer resource assets can be arranged to connect to the external network (not shown) or the Internet through a proxy server 20. The computer network 10 can include a security appliance (SA) 30. The computer network 10 can include a security computer resource asset (SCRA) 50. Any one or more of the nodes N (for example, node N31) in the network 10 can include a computer resource asset (CRA) 40 that can be arranged to connect through the proxy server 20 to the external network (not shown) or the Internet. The SA 30 or SCRA 50 can be located at any one or more nodes N in the computer network 10, such as, for example, nodes N6 and N23, respectively.

The proxy server 20 can be located, for example, on the computer network 10, at an Internet Service Provider (ISP) site, or at a node on the Internet, such as, for example, in a third-party cloud computer network (not shown). The proxy server 20 can include a firewall server, a proxy server, a proxy gateway server, a computing resource asset, or an array of firewall servers, proxy servers, gateway servers or computing resource assets. The proxy server 20 can include a plurality of network interfaces (not shown), including, for example, an internal interface (not shown) that can connect to one or more nodes N on the network 10, and an external interface (not shown) that can connect to nodes located outside of the network 10, such as, for example, on the Internet. The proxy server 20 can be arranged to allowing bridging of the Internet or an external network (not shown) to the computing resource assets or the nodes N on the network 10 to provide a broad range of information resources or services, including the World Wide Web (WWW), electronic mail, telephony, and file sharing.

The SCRA 50 can include a fully autonomous computer resource asset that can remediate cyberthreats on the computer network 10 without user intervention. The SCRA 50 can include a communicating device that is located at a site that is monitored or operated by a security analyst, network security engineer or other network or information technology (IT) security user.

The CRA 40 can include one or more computing resources 42, a computing device (CD) 44 and one or more hardware devices 46. The computing resource 42 can include, for example, a software application, a computer program, an application program interface (API), a library, or any other computer readable instructions or code. The computing resource 42 can be arranged to run on an operating system (OS) kernel as a computing resource process (CR process). Every computing resource 42 that is created, opened, or executed on the operating system creates a corresponding CR process. The OS kernel can be arranged to run on the CD 44 and carry out one or more CR processes. The OS kernel can include, for example, a monolithic kernel or a microkernel. The OS kernel can, when a computer resource 42 is triggered, initiate and carry out the CR process for that computer resource 42, including allocating resources for the CR process, such as, for example, hard disk space, memory space, processing time or space, or other services on one or more of the hardware devices 46. The OS kernel can carry out the CR process by allocating memory space and processing resources to the process, loading the corresponding computing resource into the allocated memory space, executing instructions of the computing resource on the OS kernel, or interfacing the CR process to one or more of the hardware devices 46. The OS kernel can carry out the CR process by interfacing between the CR process and one or more of the hardware devices 46 to connect through the proxy server 20 to a node located outside the computer network 10 (for example, on the Internet). The OS kernel can load Internet Protocol (IP) configuration data to connect the CR process to the proxy server 20 via, for example, a network interface 45 (shown in FIG. 3).

The CD 44 can include any computing device, such as, for example, a central processing unit (CPU), a graphic processing unit (GPU), a general-purpose GPU (GPGPU), a field programmable gate array (FGPA), an application-specific integrated circuit (ASIC), a many core processor, multiple microprocessors, or any other computing device architecture can be arranged for operation of the CRA 40. The OS kernel can be arranged to execute on the CD 44 and have control over operations in the CRA 40. The OS kernel can represent the highest level of privilege on operating system (OS) or the CD 44. The OS kernel can include a driver for each of the hardware devices 46.

The hardware device 46 can include any physical (or virtual) device that can be arranged to connect to, or be included in the CRA 40, including, for example, a user interface, a transmitter, a receiver, a transceiver, a modulator, a demodulator, a modem, a communicating device, a computing device, a random-access-memory (RAM), a read-only-memory (ROM), a database, or a computer readable medium. The hardware device can include a sound generation device, a speaker, a sound pickup device, a microphone, a display device, a light emitting diode (LED) display, a liquid crystal display (LCD), a voice command device, a smart voice recognition device or a voice activated device. The hardware device 46 can be arranged to connect to the proxy server 20 over a communication link.

The OS kernel can be arranged to control all operations on the CRA 40. The OS kernel can be arranged to control operations of the computing resources 42, CD 44 or hardware devices 46 at one or more of layers 1 to 7 in the OSI model (shown in FIG. 2). The OS kernel can be arranged to allocate resources or services to the computing resources 42 or hardware devices 46, enable computing resources 42 or hardware devices 46 to share or exchange information, protect the resources or services of each computing resource 42 or hardware device 46 from other computing resources 42 or hardware devices 46, or enable synchronization amongst the computing resources 42 or hardware devices 46. The OS kernel can be arranged to connect a CR process to a computing resource asset (not shown) on the Internet through the hardware device 46 and the proxy server 20.

The OS kernel can be arranged to facilitate interactions between the computing resources 42 and hardware devices 46. The CD 44, which can include the OS kernel, can be arranged to arbitrate access to services or the hardware devices 46 by the CR processes, including, for example, running time on the CD 44. The OS kernel can be arranged to take responsibility for deciding at any time which of one or more CR processes should be allocated to any of the hardware devices 46. The OS kernel can be arranged to determine whether a request from a CR process is appropriate or authorized, such as, for example, a request by a CR process to access a file, connect to the Internet, or view configuration data. If the OS kernel determines that a request from a CR process is appropriate or authorized, the OS kernel can be arranged to carry out the requested action, such as, for example, granting the CR process access to a service such as, for example, a file, a connection to the Internet, or configuration data.

The OS kernel can be arranged to maintain a data structure for each computing resource 42 (or hardware device 46), including, for example, a description of the state and resources or services owned by the computing resource 42, thereby enabling the OS kernel to exert control over each computing resource 42 (or hardware device 46) and corresponding CR process. The OS kernel can include a data structure such as, for example, Process Control Block (PCB), Thread Controlling Block (ThCB), Task Controlling Block (TCB), Task Struct, Switchframe or any other data structure suitable for the OS kernel to manage each of the CR processes for the computing resources 42, including runtime scheduling, memory access, input/output (I/O) interface access or performance monitoring. For each of the computing resources 42, the data structure can include, for example, process identification data, process state data, and process control data to uniquely identify each corresponding CR process when running on the OS kernel. The OS kernel can reference the data structure when determining whether to allow a CR process to connect to the proxy server 20 (shown in FIG. 1), so as to connect to an external computer resource asset (not shown) located on the Internet. The CR process identification data can include a process identifier (or PID) such as commonly used in operating system kernels in, for example, UNIX, macOS® or Windows®, to uniquely identify a process running on the OS kernel. The CR process identification data can be used by the OS kernel as a process parameter in function calls, runtime scheduling, termination, or other actions related to the corresponding CR process.

In a nonlimiting embodiment, the OS kernel can be arranged to access or modify the data structure (for example, PCB) when managing or executing CR processes, including scheduling, memory access, I/O interface access, or performance monitoring. The OS kernel can create or update a status table for each CR process, including a memory table, an I/O device table, and a process table. The memory table can include, for example, information about the allocation of main or virtual memory for each CR process, and authorization attributes for accessing memory areas shared among different CR processes running on the OS kernel.

The I/O device table can include, for example, information about the status or availability of each hardware device 46, information about the assignment of each hardware device 46 to a CR process, the status of I/O operations being executed by each CR process, and the location of memory buffers used for each CR process.

The process table can include process parameters, such as, for example, a unique identifier for each CR process running on the OS kernel, an identifier of any parent CR processes, a user identifier, a user group identifier, or any other information that can uniquely identify each CR process running on the OS kernel. The process table can include, for example, the status of a CR process when it is suspended, allowing the OS kernel to restart it later and still execute correctly. The process table can include the content of, for example, general-purpose registers (not shown) in the CD 44, as well as CR process status word, stack or frame pointers. During a context switch, the OS kernel can stop a CR process and allow another CR process to execute on the OS kernel, such as, for example, a CR process corresponding to another computing resource 42. The OS kernel can be arranged to stop execution of any CR process, copy out the values for that CR process in hardware registers (not shown) in the CD 44 to its data structure (for example, PCB), and update the hardware registers with the values from the data structure of the new CR process.

The OS kernel can be loaded to the CD 44 at start-up and control start-up operations of CR processes corresponding to one or more computing resources 42 in the CRA 40, including, but not limited to, input or output requests from the CR processes, or memory or processing time or space allocations for the CR processes. Once loaded and operational, the OS kernel can be arranged to receive system calls from CR processes that do not normally have permission to run, including, for example, hardware-related services such as accessing a hard disk drive 47C or the network interface 45 (shown in FIG. 3) to connect to the Internet through the proxy server 20 over a communication link.

Figure 2:
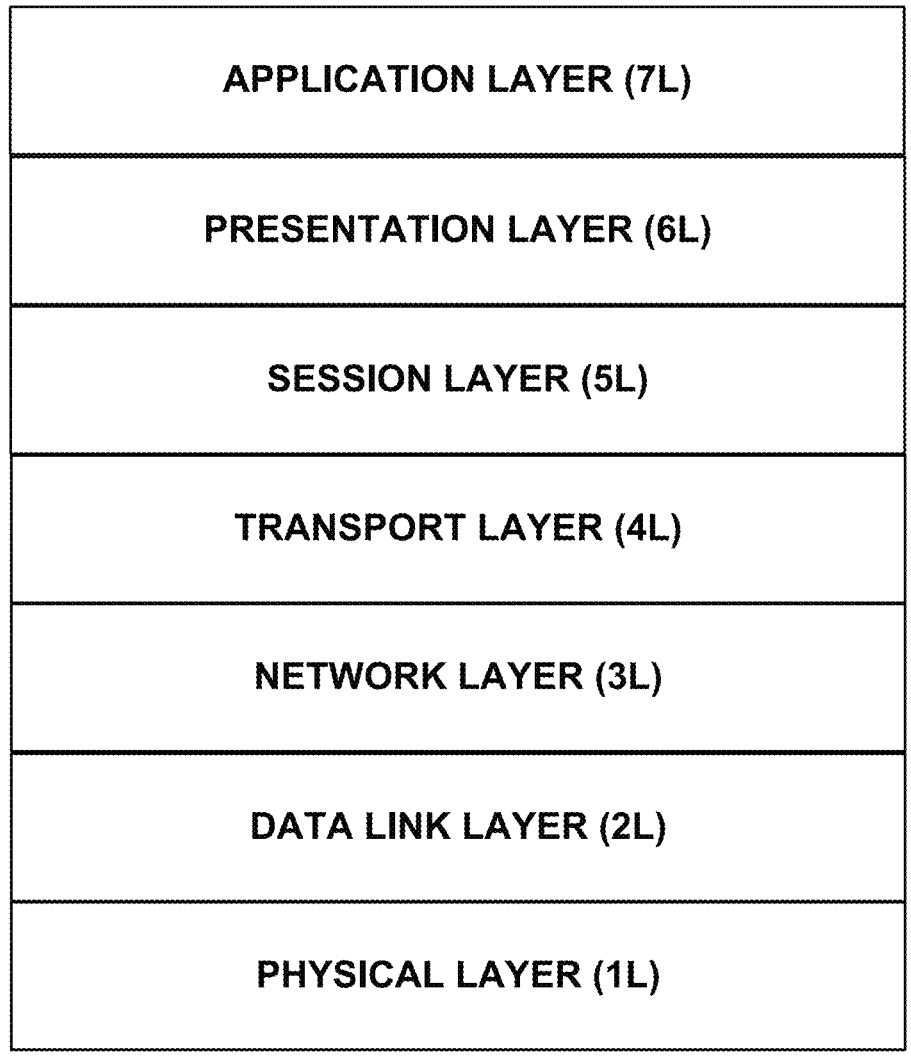
FIG. 2 shows the seven-layer OSI model that can be implemented by computer resource assets in this disclosure.

FIG. 2 shows the seven-layer OSI model that can be implemented by the proxy server 20, SA 30, CRA 40 or SCRA 50 (shown in FIG. 1). The application layer 7L is the OSI layer on the computer resource asset that is closest to the user. The application layer 7L interacts with computing resources (for example, software applications) on the computer resource asset that implement a communicating component. The application layer 7L can include a computing resource such as, for example, an email application, a web browser, or any other computing resource that an end user can interact with to operate the computer resource asset, including, for example, initiate, control, manage, or terminate functions performed by the computer resource asset.

The presentation layer 6L establishes context between computing resources, which might use different syntax and semantics. The presentation layer 6L transforms data into a form that each computing resource can accept. An operating system is an example of the presentation layer 6L.

The session layer 5L controls the communication connections between computer resource assets on the computer network 10 or between a computer resource asset on the network 10 and a computer resource asset external to the network 10, such as, through the proxy server 20. This layer is responsible for establishing, managing and terminating connections between local and remote computer resource assets. The layer can provide for full-duplex, half-duplex, or simplex operations, and is responsible for establishing checkpointing, adjournment, termination, and restart procedures.

The transport layer 4L provides the functional and procedural mechanisms for transferring variable-length data sequences from a source computer resource asset to a destination computer resource asset, while maintaining quality-of-service (QoS). The transport layer 4L controls the reliability of a given link through flow control, segmentation and desegmentation, and error control. The transport layer 4L can include, for example, tunneling protocols, the Transmission Control Protocol (TCP) and the User Datagram Protocol (UDP).

The network layer 3L provides the functional and procedural mechanisms for transferring data packets from a computer resource asset on the network 10 (for example, CRA 40) to another computer resource asset on the same or different network (for example, the Internet). If the data to be transmitted is too large, the network layer 3L can facilitate splitting the data into a plurality of segments at the node and sending the fragments independently to the other node, where the segments can be reassembled to recreate the transmitted data. The network layer 3L can include one or more layer-management protocols such as, for example, routing protocols, multicast group management, network layer information and error, and network layer address assignment.

The link layer 2L is responsible for node-to-node transfer between computer resource assets in a communication system on the network 10. In IEEE 802 implementations, the link layer 2L is divided into two sublayers, consisting of a medium access control (MAC) layer and a logical link control (LLC) layer. The MAC layer is responsible for controlling how computer resource assets in a network gain access to a medium and permission to transmit data. The LLC layer is responsible for identifying and encapsulating network layer protocols, and for controlling error checking and frame synchronization.

The physical layer 1L includes the hardware that connects the computer resource assets or nodes in the computer network 10. The hardware can include for example connectors, cables, switches, or any other devices that provide for transmission and reception of instruction and data streams between the computer resource assets. The hardware can include the hardware devices 46 (shown in FIG. 1).

Figure 3:
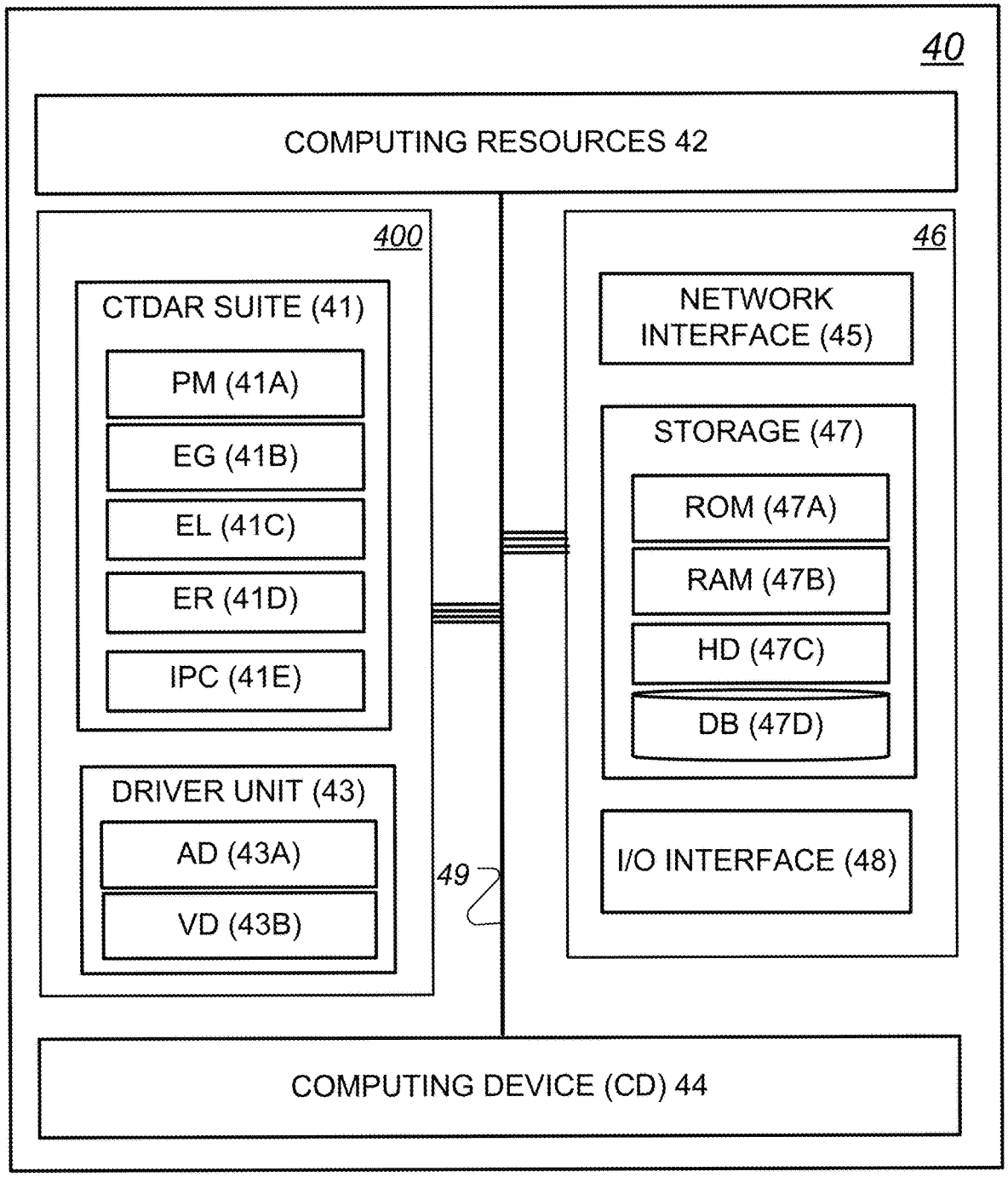
FIG. 3 shows a nonlimiting embodiment of a computer resource asset that is configured according to the principles of the disclosure.

FIG. 3 shows a nonlimiting embodiment of the CRA 40, arranged according to the principles of the disclosure. In this nonlimiting embodiment, the CRA 40 can include the computing resources 42, the computing device (CD) 44, and the hardware devices 46. The CRA 40 can include an operating system (OS) 400. Although shown as separate components, the OS 400 can be included in the CD 44 or in the storage 47, such as, for example, in a hard drive 47C. In the latter instance, the OS 400 can be loaded and executed on the CD 44. The OS 400 can include a cybersecurity threat detection and remediation (CTDAR) suite 41. The OS 400 can include a driver unit 43. The CTDAR suite 41 or driver unit 43 can each be arranged as one or more computing devices or computing resources. The CTDAR suite 41 can be included in the OS kernel of the CRA 40.

The CTDAR suite 41 can include a process monitor (PM) 41A, an event generator (EG) 41B, an event logger (EL) 41C, an event remediator (ER) 41D or an Internet proxy configurer (IPC) 41E. The PM 41A, EG 41B, EL 41C, ER 41D or IPC 41E can be arranged as one or more computing devices or computing resources.

The driver unit 43 can include an audio driver (AD) 43A and a video driver (VD) 43B. The AD 43A can include an audio driver for a hardware device 46 such as, for example, a sound card, an interactive voice response (IVR) unit, a speaker or any other hardware device necessary to render a sound. The VD 43B can include a video driver for a hardware device 46 such as, for example, a video card, a video adaptor, a display device or any other device necessary to render an image signal.

The PM 41A can be arranged to check and enumerate all CR processes running on the OS kernel. The PM 41A can be arranged to monitor each CR process and check each CR process for all connectivity activity, including to determine whether the CR process is connecting or attempting to connect to the proxy server 20 (shown in FIG. 1) in order to connect to a node on the Internet. The PM 41A can be arranged to monitor for connectivity activity between any CR process and, for example, the network interface 45 to connect to the proxy server 20. The PM 41A can be arranged to enumerate every CR process running on or interacting with the OS kernel, including the process' file path (including, for example, canonical path), process name, and process identification number, which can be generated by the OS kernel for each CR process. The PM 41A can be arranged to generate process instantiation verification data for each CR process that requests access to Internet proxy configuration data or that is connecting to the proxy server 20 (shown in FIG. 1).

The Internet proxy configuration data can include configuration data necessary for a CR process to connect to the proxy server 20 (shown in FIG. 1), such as, for example, an IP address, a port number, a port type or any other information necessary to connect the CR process to the Internet or external network through the proxy server 20.

The process instantiation verification data can include process parameters, such as, for example, the process name, canonical path, and identification number for each corresponding CR process running on the OS kernel. The process parameters can include an identification of each CR process that is connecting to the proxy server 20, or that requests access to the Internet proxy configuration data to connect to a node located outside the network 10, such as, for example, on the Internet.

The EG 41B can be arranged to compare the process parameters in the process instantiation verification data, including, for example, process name, identification number and canonical path, for each CR process against records of instantiated CR processes to determine whether the CR process corresponding to the process parameters has been previously seen by the OS kernel, which can be referred to as an "instantiated process". The records can be stored in the storage 47, and each record can include a plurality of fields corresponding to each process parameter, including a process name field, a process identification number field and a canonical path field. The storage 47 can include an authorization database or library of all CR processes (or computing resources 42) that are authorized to run on the OS kernel. The authorization database can include a computing resource (CR) whitelist, that includes all CR processes (or computing resources 42) that are authorized to run on the OS kernel. The EG 41B can be arranged to interact with the EL 41B to update the records in the authorization database (for example, DB 47D, shown in FIG. 3) with a new record entry, including the process instantiation verification data and a timestamp for each CR process that is connecting to the proxy server 20 (shown in FIG. 1) or that requests access to Internet proxy configuration data to connect to the proxy server 20. The timestamp can include a date and time when, for example, the corresponding CR process connected to the proxy server 20 or requested the Internet proxy configuration data in order to connect to the Internet (or external network) through the proxy server 20.

The EG 41B can be arranged to generate an event notification when it determines that one or more process parameters (for example, the process name and canonical path) in the process instantiation verification data does not match data in the corresponding data fields in the records of instantiated CR processes stored in the authorization database (for example, DB 47D, shown in FIG. 3). The EG 41B can be arranged further to compare the nonmatching processes parameter(s) (for example, process name and canonical path) against the CR whitelist stored in the database (for example, DB 47D). The EG 41B can be arranged to generate an event notification when it determines that the CR whitelist does not include any CR processes (or computing resources) that match the process parameters in the process instantiation verification data. The event notification can include an indication that the unmatched CR process corresponding to the process parameters was an unauthorized CR process and, therefore, might include malicious code or malware running on the OS kernel that can expose the CRA 40 or network 10 to a cyberthreat.

The EL 41C can be arranged to interact with, for example, the storage 47 and update the records with a new record (or log) entry, including the process instantiation verification data and timestamp for the corresponding CR process that is connecting to the proxy server 20 (shown in FIG. 1) or that requested access to the Internet proxy configuration data in order to connect the Internet (or external network) through the proxy server 20. The EL 41C can be arranged to record the event notification, including the process instantiation verification data and timestamp. The EL 41C can be arranged to interact with the ER 41D and record (or log) an event remediation action corresponding to the event notification.

The ER 41D can be arranged to remediate a cyberthreat related to an unauthorized CR process. The ER 41D can be arranged to generate the event remediation action, which can be based on receiving the event notification from the EL 41C. For instance, the ER 41D can cause the OS kernel to terminate the corresponding CR process, terminate all connectivity to the CR process, or to drive, for example, the network interface 45 to transmit the event notification to the SCRA 50 (shown in FIG. 1), which can carry out a remediation action by, for example, terminating all connectivity to or from the CRA 40, modifying a network firewall policy, privileges or rules for the CRA 40 or its user, or taking the CRA 40 offline for cyberthreat analysis or remediation. The ER 41D can be arranged to interact with the IPC 41E.

The IPC 41E can be arranged to initiate, manage or terminate connections between the CR processes on the OS kernel and other computer resource assets or nodes on or external to the network 10 via the hardware device 46, such as, for example, the network interface 45. The IPC 41E can be arranged to connect the CR process (for example, through the network interface 45) to the proxy server 20 (shown in FIG. 1), which in turn can create a proxy connection and communication link to the Internet or another network (not shown) to facilitate data flow between the CR process and one or more computer resource assets or nodes outside the network 10 (shown in FIG. 1). The IPC 41E can be arranged to create, maintain or update Internet proxy configuration data.

The hardware devices 46 can include the network interface 45, the storage 47, an input/output (I/O) interface 48, a modem (not shown), a transmitter (not shown), a receiver (not shown), a computing device (not shown), a communicating device (not shown), or any other device, as will be understood by those skilled in the art. The CRA 40 can include a bus 49, which can connect to any of the components 41 to 48 via a communication link. The storage 47 can be arranged as one or more computing devices or computing resources in or connected to the CRA 40. The storage 47 can include a read-only-memory (ROM) 47A, a random-access-memory (RAM) 47B, a hard drive (HD) 47C or a database (DB) 47D. The storage 47 can include a non-transitory computer-readable storage medium that can hold executable or interpretable computer program code or instructions that, when executed on the CD 44, cause the steps, processes or methods in this disclosure to be carried out. The computer-readable storage medium can be included in, for example the HD 47C. The computer-readable storage medium can include the OS kernel. The computer-readable storage medium can include the OS 400.

A basic input/output system (BIOS) can be stored in a non-volatile memory in the storage 47, such as, for example, the ROM 47A, which can include, for example, a ROM, an EPROM, or an EEPROM. The BIOS can contain the basic routines that help to transfer information between components in the CRA 40, such as during start-up.

The RAM 47B can include a high-speed RAM such as static RAM for caching data.

The HD 47C can include, for example, a hard disk drive (HDD), an optical disk drive (ODD), an enhanced integrated drive electronics (EIDE) drive or a serial advanced technology attachments (SATA) drive. The HD 47C can include a read/write from/to a CD-ROM disk (not shown), or, read from or write to other high capacity optical media such as a digital versatile disc (DVD). The HD 47C can be arranged for external use in a suitable chassis (not shown). The HD 47C can be arranged to connect to the bus 49 via a hard disk drive interface (not shown) or an optical drive interface (not shown). The hard disk drive interface (not shown) can include a Universal Serial Bus (USB) (not shown) or an IEEE 1394 interface (not shown) for external applications.

The DB 47D (or HD 47C) can be arranged to store the records or logs of instantiated processes (including, for example, instantiated process name, instantiated process identification number and instantiated process canonical path), process instantiation verification data (including, for example, process name, identification number and canonical path), timestamps, event notifications, process or CR whitelist, or event remediation actions. The DB 47D can include an inventory of all computing resources 42 or CR processes that are authorized to run on or interact with the OS kernel. The DB 47D can include the CR whitelist database and the authorization database, including all CR processes (or computing resources 42) that are authorized to run on the OS kernel.

The DB 47D can be arranged to be accessed by any one or more of the components 41 to 49 in the CRA 40. The DB 47D can be arranged to receive a query and, in response, retrieve specific records or portions of records based on the query. A record can include, for example, a file or a log. The DB 47D can include the CR whitelist. The DB 47D can include a database management system (DBMS) that can interact with the components 41 to 49. The DBMS can be arranged to interact with computer resource assets outside of the CRA 40, such as, for example, the SA 30 or SCRA 50 (shown in FIG. 1). The DB 47D can include a DBMS such as, for example, SQL, MySQL, Oracle, Postgress, Access, or Unix. The DB 47D can include a relational database.

The storage 47, including computer-readable media, can be arranged to provide nonvolatile storage of data, data structures, and computer-executable instructions. The storage 47 can accommodate the storage of any data in a suitable digital format. The storage 47 can include one or more computing resources such as, for example, program modules or software applications that can be used to execute aspects of the architecture included in this disclosure. One or more computing resources can be stored in the storage 47, including, for example, the OS 400, the CTDAR suite 41, one or more of components 41A to 41E, an application program, an application program interface (API), a program module, or program data. The computing resource can include an API such as, for example, a web API, a simple object access protocol (SOAP) API, a remote procedure call (RPC) API, a representation state transfer (REST) API, or any other utility or service API. One or more of the computing resources can be cached in the RAM 47B as executable sections of computer program code or retrievable data.

The network interface 45 can be arranged to connect to the computer network 10 (shown in FIG. 1), the proxy server 20, the SA 30, or the SCRA 50. The network interface 45 can be arranged to connect to the Internet or an external network (not shown) through the proxy server 20. The network interface 45 can be arranged to connect to the computer resource assets or nodes N in the computer network 10 (shown in FIG. 1). The network interface 45 can include a wired or a wireless communication network interface (not shown) or a modem (not shown). When used in a LAN, the network interface 45 can be arranged to include a wired or wireless communication network interface that can connect to the LAN; and, when used in a wide area network (WAN), the network interface 45 can be arranged to include a modem to connect to the WAN network. The modem (not shown) can be internal or external and wired or wireless. The modem can be connected to the bus 49 via, for example, a serial port interface (not shown).

The (I/O) interface 48 can be arranged to receive commands or data from an operator. The I/O interface 48 can be arranged to connect to or communicate with one or more input/output devices (not shown), including, for example, a keyboard (not shown), a mouse (not shown), a pointer (not shown), a microphone (not shown), a speaker (not shown), or a display (not shown). The received commands or data can be forwarded from the I/O interface 48 as instruction and data signals via the bus 49 to any component in the SA 30.

In a nonlimiting embodiment, the CTDAR suite 41 can be downloaded to or installed on to the CRA 40 from the SA 30 (shown in FIG. 1). In an alternative embodiment, fewer than all the components 41A to 41E can be loaded to or installed on the CRA 40. The SA 30 can include the components 41A to 41E and load or install the components to a plurality of the computer resource assets on the network 10 (shown in FIG. 1), including the CRA 40.

Figure 4:
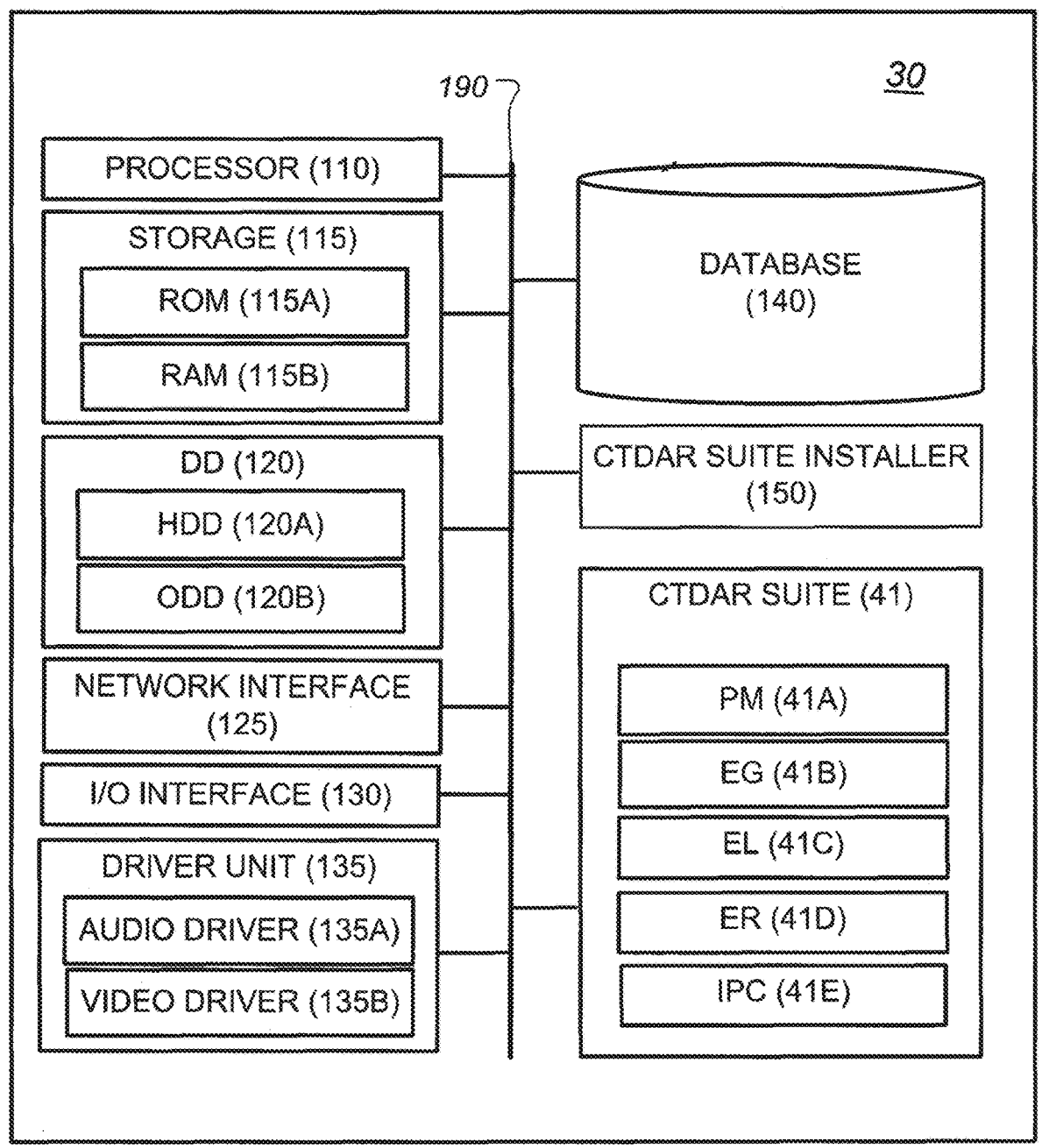
FIG. 4 shows a nonlimiting embodiment of a security appliance that is constructed according to the principles of the disclosure.

FIG. 4 shows a nonlimiting embodiment of the SA 30, constructed according to the principles of the disclosure. The SA 30 can include a processor 110, a storage 115, a disk drive (DD) 120, a network interface 125, an input/output (I/O) interface 130, a driver unit 135, a database 140 and a cybersecurity threat detection and remediation (CTDAR) suite installer 150. The SA 30 can include the CTDAR suite 41, discussed above with reference to FIG. 2. The SA 30 can include a bus 190, which can be connected by a communication link to each of the components 110 to 150. The bus 190 can be arranged to connect to the CTDAR suite 41. Any one or more of the components 115 to 190 can include a computing device or a computing resource that is separate from the processor 110, as seen in FIG. 4, or integrated or integrateable in a computing device such as the processor 110.

The processor 110 can include any of various commercially available computing devices, including for example, a central processing unit (CPU), a graphic processing unit (GPU), a general-purpose GPU (GPGPU), a field programmable gate array (FGPA), an application-specific integrated circuit (ASIC), a many core processor, multiple microprocessors, or any other computing device architecture can be included in the processor 110.

The SA 30 can include a non-transitory computer-readable storage medium that can hold executable or interpretable computer program code or instructions that, when executed by the processor 110 or one or more of the other components (e.g., computing devices or computing resources) in the SA 30, causes the steps, processes or methods in this disclosure to be carried out. The computer-readable storage medium can be included in the storage 115 or DD 120. The computer readable storage medium can include sections or segments of computer program code or instructions that, when executed by one or more components in the SA 30, can cause the SA 30 to carry out the processes set forth in or contemplated by this disclosure.

The storage 115 can include a read-only-memory (ROM) 115A and a random-access-memory (RAM) 115B. A basic input/output system (BIOS) can be stored in the non-volatile memory 115A, which can include, for example, a ROM, an EPROM, or an EEPROM. The BIOS can contain the basic routines that help to transfer information between components in the SA 30, such as during start-up. The RAM 115B can include a high-speed RAM such as static RAM for caching data.

The DD 120 can include a hard disk drive (HDD) 120A and an optical disk drive (ODD) 120B. The HDD 120A can include an enhanced integrated drive electronics (EIDE) drive or a serial advanced technology attachments (SATA) drive. The ODD 120B can include a read/write from/to a CD-ROM disk (not shown), or, read from or write to other high capacity optical media such as a digital versatile disc (DVD). The HDD 120A or ODD 120B can be arranged for external use in a suitable chassis (not shown). The DD 120 can be connected to the bus 190 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications. The DD 120 can include the CTDAR suite 41.

The storage 115 or DD 120, including computer-readable media, can provide nonvolatile storage of data, data structures, and computer-executable instructions. The storage 115 or DD 120 can accommodate the storage of any data in a suitable digital format. The storage 115 or DD 120 can include one or more computing resources such as, for example, program modules or software applications that can be used to execute aspects of the architecture included in this disclosure.

One or more computing resources can be stored in the storage 115 or DD 120, including, for example, an operating system (OS), an application program, an API, a program module, or program data. The computing resource can include an API such as, for example, a web API, a SOAP API, an RPC API, a REST API, or any other utility or service API. One or more of the computing resources can be cached in the RAM 115B as executable sections of computer program code or retrievable data.

The network interface 125 can be connected to a network such as the computer network 10 (shown in FIG. 1) or the Internet (not shown). The network interface 125 can be arranged to connect to the computer resource assets or nodes N in the computer network 10 (shown in FIG. 1), including the CRA 40 (shown in FIGS. 1 and 3) or SCRA 50 (shown in FIG. 1). The network interface 125 can be arranged to connect to the proxy server 20 (shown in FIG. 1). The network interface 125 can include a wired or a wireless communication network interface (not shown) or a modem (not shown). When used in a LAN, the SA 30 can be arranged to connect to the LAN through the wired or wireless communication network interface; and, when used in a wide area network (WAN), the SA 30 can be arranged to connect to the WAN network through the modem. The modem (not shown) can be internal or external and wired or wireless. The modem can be connected to the bus 190 via, for example, a serial port interface (not shown).

The I/O interface 130 can receive commands or data from an operator. The I/O interface 130 can be arranged to connect to or communicate with one or more input/output devices (not shown), including, for example, a keyboard (not shown), a mouse (not shown), a pointer (not shown), a microphone (not shown), a speaker (not shown), or a display (not shown). The received commands or data can be forwarded from the I/O interface 130 as instruction or data signals via the bus 190 to any component in the SA 30.

The driver unit 135 can include an audio driver 135A and a video driver 135B. The audio driver 135A can include a sound card, a sound driver (not shown), an interactive voice response (IVR) unit, or any other device necessary to render a sound signal on a sound production device (not shown), such as for example, a speaker (not shown). The video driver 135B can include a video card (not shown), a graphics driver (not shown), a video adaptor (not shown), or any other device necessary to render an image signal on a display device (not shown).

The database 140 can be arranged to store computer resource asset (CRA) inventory data for the computer network 10 (shown in FIG. 1). The database 140 can be arranged to store a CR whitelist of authorized CR processes or computing resources for specific CRAs or for all CRAs. The CRA inventory data can include related data for each node N, including, for example, CRA configuration, IP address, MAC address, policies, or rules. The database 140 can be arranged to store the records of instantiated processes (including, for example, instantiated process name, instantiated process identification number and instantiated process canonical path), process instantiation verification data (including, for example, process name, identification number and canonical path), timestamps, event notifications, CR whitelist, or event remediation actions for each of the computer resources assets (for example, CRA 40, shown in FIGS. 1 and 3) on the computer network 10 (shown in FIG. 1) that include the OS 400 (shown in FIG. 3). The database 140 can be arranged to be accessed by any one or more of the components 110 to 190 in the SA 30. The database 140 can be arranged to receive queries and, in response, retrieve specific records or portions of records based on the queries. The database 140 can include a DBMS that can interact with the components 110 to 190. The DBMS can be arranged to interact with computer resource assets outside of the SA 30. The DBMS can include, for example, SQL, MySQL, Oracle, Postgress, Access, or Unix. The database 140 can include a relational database.

The CTDAR suite installer 150 can be arranged to interact with each computer resource asset or node N on the computer network 10 (shown in FIG. 1), including the CRA 40 (shown in FIGS. 1 and 3). The CTDAR suite installer 150 can be arranged to connect to the CRA 40 and load or install the OS 400 or CTDAR suite 41 to the CRA 40. The CTDAR suite installer 150 can be arranged to load or install all the components in the CTDAR suite 41, or fewer than all, such as, for example, only one or more of the PM 41A, EG 41B, EL 41C, ER 41D or IPC 41E.

The CTDAR suite installer 150 can be arranged to interact with the database 140 and query CRA inventory data. The CTDAR suite installer 150 can be arranged to manage and implement an inventory of all computer resource assets and nodes in the computer network 10. The CTDAR suite installer 150 can be arranged to provide a profile for each computer resource asset or node N in the computer network 10, and to periodically update CRA inventory data for the network 10. The CRA inventory data can include historical CRA inventory data for all computer resource assets or nodes on the computer network 10.

Figure 5:
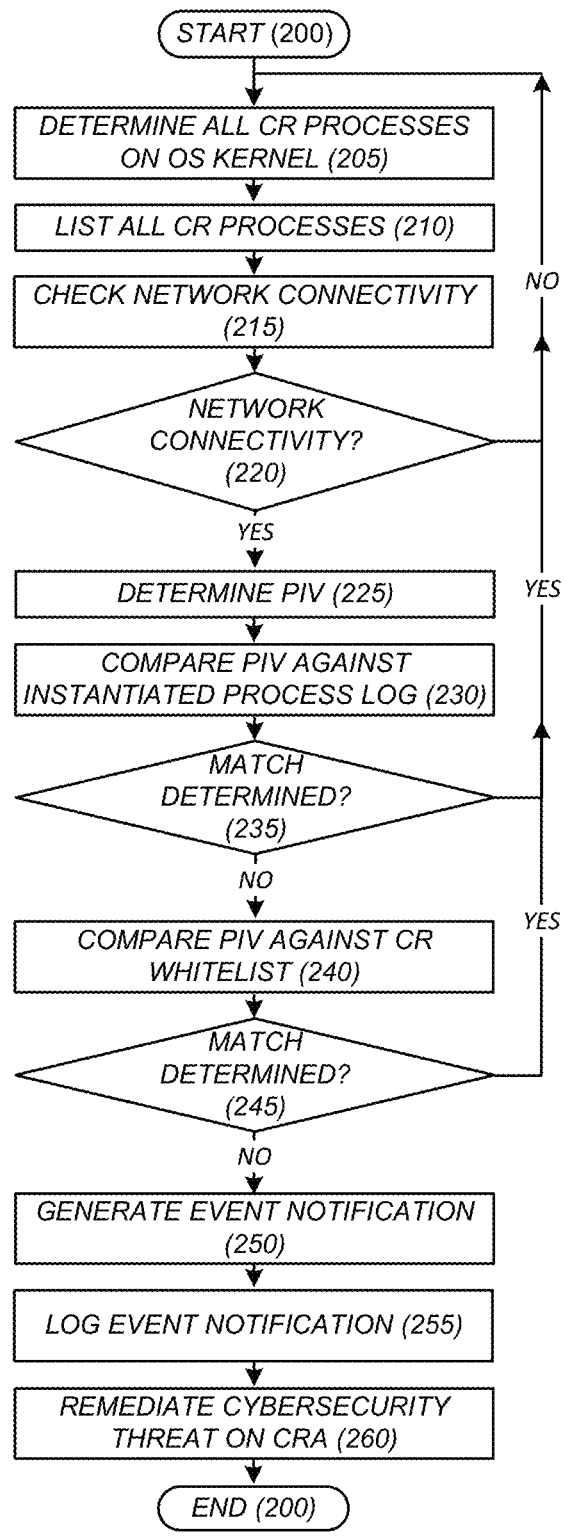
FIG. 5 shows a nonlimiting embodiment of a cybersecurity threat remediation process, according to the principles of the disclosure.

FIG. 5 shows a nonlimiting embodiment of a cybersecurity threat remediation process 200, according to the principles of the disclosure. The process 200 can be carried out by the OS 400 (shown in FIG. 3). Referring to FIGS. 1, 3 and 5, the OS 400 (for example, PM 41A, shown in FIG. 3) can determine all computing resources 42 that are running on the OS kernel as CR processes (Step 205). The OS 400 can enumerate all the CR processes running on the OS kernel (Step 210) and check each CR process for network connectivity (Step 215). Steps 205 through 215 can be performed continuously or periodically, such as, for example, every 60 seconds. It is note that the Steps 205 through 215 200 can be performed more frequently, or less frequently than every 60 seconds.

If a CR process is determined to be connecting to the proxy server 20 (shown in FIG. 1) (YES at Step 220), then the OS 400 (for example, PM 41A, shown in FIG. 3) can determine the process instantiation verification (PIV) data for that CR process (Step 225), otherwise the OS 400 can check for any new CR processes that might be running on the OS kernel (NO at Step 220, then Step 205). The PIV data can include process parameters, such as, for example, process name, identification number assigned to the CR process by the OS kernel, and a canonical or file path for that CR process.

The process parameters in the PIV data can be compared by the OS 400 (for example, by the PM 41A, shown in FIG. 3) against records of instantiated CR processes to determine whether the CR process corresponding to the PIV data has been previously seen by the OS kernel (Step 230). In a nonlimiting embodiment, the OS 400 can compare one or more process parameters in the PIV data, such as, for example, the process name, identification number or canonical path for the CR process against corresponding data fields in records of instantiated processes stored in, for example, the database 47D (shown in FIG. 3). If a match is determined (YES at Step 235), then the OS 400 can check for any new CR processes that might be running on the OS kernel (Step 205).

However, if no match is determined (NO at Step 235), then the OS 400 (for example, EG 41B shown in FIG. 3) can compare one or more of the process parameters in the PIV data (such as, for example, the process name and canonical path) against the CR whitelist (Step 240). The CR whitelist can be stored in the whitelist database (for example, DB 47D, shown in FIG. 3). If the process parameters are determined to match data in the corresponding data fields in the CR whitelist (YES at Step 245), then the OS 400 (for example, EG 41B, shown in FIG. 3) can determine that the CR process has been seen before by the OS kernel and the OS 400 (for example, PM 41A shown in FIG. 3) can proceed to check for any new CR processes that might be running on the OS kernel (Step 205).

However, if the process parameters in the PIV data do not match data in the corresponding data fields in the CR whitelist (NO at Step 245), then the OS 400 (for example, EG 41B, shown in FIG. 3) can generate an event notification (Step 250). The event notification can include an indication that the CR process corresponding to the PIV data was an unauthorized CR process and, therefore, could be malicious code or malware running on or interacting with the OS kernel. The OS 400 (for example, EL 41C, shown in FIG. 3) can be arranged to interact with the storage 47 and update the records with a new record that includes the PIV data and timestamp for the nonmatching CR process (Step 255). Based on the event notification, any cybersecurity threat presented to the CRA 40 by the nonmatching CR process can be remediated (Step 260). The cybersecurity threat can be remediated by the OS 400 (for example, ER 41D, shown in FIG. 3), which can be arranged to remediate the cybersecurity threat by terminating the CR process, suspending the CR process, terminating connectivity between the CR process and any hardware devices 46 or computing resource 42, or suspending connectivity between the CR process and any hardware device 46 or computing resource 42.

The cybersecurity threat can be remediated by the SCRA 50 (shown in FIG. 1). In Step 260, the event notification can be transmitted to the SCRA 50. The SCRA 50 can, autonomously or under control of a user, remediate the cyberthreat by, for example, terminating connectivity to the CRA 40 or modifying a policy or rule on the proxy server 20 (shown in FIG. 1).

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communicating device," as used in this disclosure, means any computing device, hardware, or computing resource that can transmit or receive data packets, instruction signals or data signals over a communication link. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (µC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The terms "computer resource asset" or "computing resource asset," as used in this disclosure, means a computing resource, a computing device or a communicating device, or any combination thereof.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "computing resource," as used in this disclosure, means software, a software application, a web application, a web page, a computer application, a computer program, computer code, machine executable instructions, firmware, or a process that can be arranged to execute on a computing device or a communicating device.

The term "computing resource process" or "CR process," as used in this disclosure, means a computing resource that is in execution or in a state of being executed on an operating system of a computing device. Every computing resource that is created, opened or executed on or by the operating system can create a corresponding "CR process." A "computing resource process" or "CR process" can include one or more threads, as will be understood by those skilled in the art.

The terms "connectivity" or "connectivity link," as used in this disclosure, means a communication link or any combination of communication links that connects two or more nodes, carrying data packets between the nodes. A data packet can include an Internet Protocol (IP) data packet. A data packet can include an instruction signal that, when received by a communicating device can cause the device to carry out a predetermined function or task. The data packet can include a data packet signal that, when received by a communicating device can be implemented in carrying out a predetermined function or task, or processed to render information.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "node," as used in this disclosure, means a physical or virtual location in a computer network that comprises or can comprise a computer resource asset.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for detecting and remediating malicious code in a communicating device on a computer network that connects to the Internet through a proxy server, the method comprising:
    monitoring all computing resource (CR) processes on an operating system kernel on the communicating device;
    determining process parameters for each computing resource (CR) process, including at least one of a canonical path, a process name, and a process identification number;
    determining, for each computing resource (CR) process, whether the computing resource (CR) process is a connecting CR process by determining whether the computer resource (CR) process is connecting to the proxy server;
    comparing at least one of the process parameters against an instantiated process log;
    if no match occurs in comparing the at least one of the process parameters against the instantiated process log, comparing at least one of the process parameters for each connecting CR process with a computing resource (CR) whitelist;
    generating an event notification when the at least one process parameter for a connecting CR process does not match any record in the computing resource (CR) whitelist; and
    remediating said connecting CR process having said at least one process parameter,
    wherein the CR process comprises fileless malware or reverse shells.

2. The method in claim 1, wherein said at least one of the process parameters comprises the process name and canonical path.

3. The method in claim 1, wherein the computing resource (CR) whitelist comprises a list of processes authorized to run on the operating system kernel.

4. The method in claim 1, wherein the remediating said connecting CR process comprises terminating said connecting CR process.

5. The method in claim 1, wherein the remediating said connecting CR process comprises sending the event notification to another communicating device on the computer network to execute a remedial action.

6. The method in claim 1, further comprising:
    creating a record containing the process parameters for the connecting CR process and storing the record in a storage on the communicating device.

7. The method in claim 6, wherein the stored record includes the canonical path, process name, and process identification number.

8. The method in claim 6, wherein the stored record includes a time stamp when the connecting CR process was determined to be connecting to the proxy server.

9. The method in claim 1, wherein the process identification number is generated by the operating system kernel.

10. A system for detecting and remediating malicious code in a communicating device on a computer network that connects to the Internet through a proxy server, the system comprising:
    a physical memory with instructions at a kernel level arranged to
        monitor all computing resource (CR) processes on an operating system kernel on the communicating device,
        determine process parameters for each computing resource (CR) process, including at least one of a canonical path, a process name, and a process identification number,
        determine, for each computing resource (CR) process, whether the computing resource (CR) process is a connecting CR process by determining whether the computer resource (CR) process is connecting to the proxy server,
        compare at least one of the process parameters against an instantiated process log;
        if no match occurs in comparing the at least one of the process parameters against the instantiated process log, compare at least one of the process parameters for each connecting CR process with a computing resource (CR) whitelist,
        generate an event notification when the at least one process parameter for a connecting CR process does not match any record in the computing resource (CR) whitelist, and
        remediate said connecting CR process having said at least one process parameter,
        wherein the CR process comprises fileless malware or reverse shells.

11. The system in claim 10, wherein the instructions further comprises a process monitor that is arranged to
    monitor all the computing resource (CR) processes on the operating system kernel on the communicating device,
    determine the process parameters for each computing resource (CR) process, including the canonical path, process name, and process identification number, and
    determine the connecting CR process by determining whether the computer resource (CR) process is connecting to the proxy server.

12. The system in claim 10, wherein the instructions further comprises an event generator that is arranged to compare the at least one of the process parameters for each connecting CR process with the computing resource (CR) whitelist, and generate the event notification when the at least one process parameter for the connecting CR process does not match any record in the computing resource (CR) whitelist.

13. The system in claim 10, wherein the instructions further comprises an event remediator that is arranged to remediate said connecting CR process having said at least one process parameter.

14. The system in claim 10, wherein the instructions further comprises an event logger that is arranged to create a record containing the process parameters for the connecting CR process and store the record in a storage on the communicating device.

15. The system in claim 10, wherein said at least one of the process parameters comprises the process name and canonical path.

16. The system in claim 10, wherein the computing resource (CR) whitelist comprises a list of processes authorized to run on the operating system kernel.

17. The system in claim 10, wherein the remediate said connecting CR process having said at least one process parameter comprises terminating said connecting CR process.

18. The system in claim 10, wherein the remediate said connecting CR process having said at least one process parameter comprise sending the event notification to another communicating device on the computer network to execute a remedial action.

19. The system in claim 14, wherein the stored record includes the canonical path, process name, and process identification number.

20. The system in claim 14, wherein the stored record includes a time stamp when the connecting CR process was determined to be connecting to the proxy server.

21. The system in claim 10, wherein the process identification number is generated by the operating system kernel.

22. A non-transitory computer readable storage medium storing computer program instructions at a kernel level that, when executed by a computing device on a communication device on a computer network that connects to the Internet through a proxy server, detects and remediates malicious code on the communicating device, the computer program instructions comprising:

monitoring all computing resource (CR) processes on an operating system kernel on the communicating device;

determining process parameters for each computing resource (CR) process, including at least one of a canonical path, a process name, and a process identification number;

determining, for each computing resource (CR) process, whether the computing resource (CR) process is a connecting CR process by determining whether the computer resource (CR) process is connecting to the proxy server;

comparing at least one of the process parameters against an instantiated process log;

if no match occurs in comparing the at least one of the process parameters against the instantiated process log, comparing at least one of the process parameters for each connecting CR process with a computing resource (CR) whitelist;

generating an event notification when the at least one process parameter for a connecting CR process does not match any record in the computing resource (CR) whitelist; and remediating said connecting CR process having said at least one process parameter, wherein the CR process comprises fileless malware or reverse shells.

23. The non-transitory computer readable storage medium in claim 22, the computer program instructions further comprising:

creating a record containing the process parameters for the connecting CR process and storing the record in a storage on the communicating device.

* * * * *